(12) United States Patent
Jiang

(10) Patent No.: US 9,491,166 B2
(45) Date of Patent: Nov. 8, 2016

(54) APPARATUS AND METHOD FOR AUTHENTICATING SMART CARD

(75) Inventor: Jiewei Jiang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 433 days.

(21) Appl. No.: 13/258,346

(22) PCT Filed: May 7, 2010

(86) PCT No.: PCT/CN2010/072524
§ 371 (c)(1),
(2), (4) Date: Apr. 16, 2012

(87) PCT Pub. No.: WO2011/097843
PCT Pub. Date: Aug. 18, 2011

(65) Prior Publication Data
US 2012/0266212 A1    Oct. 18, 2012

(30) Foreign Application Priority Data
Feb. 10, 2010   (CN) .......................... 2010 1 0116363

(51) Int. Cl.
*G06F 21/00* (2013.01)
*H04L 29/06* (2006.01)
*H04W 12/06* (2009.01)

(52) U.S. Cl.
CPC .......... *H04L 63/0853* (2013.01); *H04W 12/06* (2013.01)

(58) Field of Classification Search
CPC ....... H04L 63/08; H04L 63/10; H04L 63/20; H04L 29/06; H04L 63/0428
USPC .......................................................... 726/3
See application file for complete search history.

(56) References Cited

U.S. PATENT DOCUMENTS 6,230,002 B1 *  5/2001  Floden ................... G06F 21/31
                                                       455/411
6,862,583 B1 *  3/2005  Mazzagatte .......... G06F 21/608
                                                         380/51

(Continued)

FOREIGN PATENT DOCUMENTS

CN    1326167 A    12/2001
CN    1503525 A     6/2004

(Continued)

OTHER PUBLICATIONS

International Search Report in international application No. PCT/CN2010/072524, mailed on Nov. 18, 2010.

(Continued)

*Primary Examiner* — Farid Homayounmehr
*Assistant Examiner* — Sanchit Sarker
(74) *Attorney, Agent, or Firm* — Oppedahl Patent Law Firm LLC

(57) ABSTRACT

The disclosure discloses an apparatus and a method for authenticating a smart card. The apparatus for authenticating a smart card comprises a smart card authentication service module, a Smart Card Reader (SCReader) drive module, a Personnel Computer Smart Card Drive (pcscd) service module and a virtual serial port drive module, wherein the smart card authentication service module is configured to send an initialization command to the SCReader drive module, to send an authentication request to the terminal device and the network server, and to compare smart card authentication operation results received from the network server and the terminal device; when the results are identical to each other, the authentication of the smart card is passed; the SCReader drive module is configured to receive the initialization command from the smart card authentication service module and to send the authentication operation result from the terminal device to the smart card authentication service module; the pcscd service module is configured to provide a data transmission interface for the smart card authentication service module and to send data to the virtual serial port drive module through the SCReader drive module; and the virtual serial port drive module is configured to transmit data between the terminal device and the SCReader drive module. By the device and method, the existing module of a computer can be well used; and the authentication of multiple kinds of smart cards can be implemented, so that device and method have high compatibility, and are easy to expand and widely applied.

9 Claims, 2 Drawing Sheets

(56) References Cited

U.S. PATENT DOCUMENTS

| | | | | |
|---|---|---|---|---|
| 7,481,363 B2* | 1/2009 | Zuili | ............ | G06Q 20/341 235/380 |
| 8,166,524 B2* | 4/2012 | Sentinelli | ............ | G06F 21/34 340/5.1 |
| 8,172,138 B2* | 5/2012 | Sherf | ............ | G06Q 20/1235 235/375 |
| 8,332,935 B2* | 12/2012 | Brown | ............ | G06Q 20/341 705/12 |
| 8,595,485 B2* | 11/2013 | Liang | ............ | H04L 63/0823 380/247 |
| 2001/0048025 A1* | 12/2001 | Shinn | ............ | A61B 5/117 235/382 |
| 2003/0004876 A1* | 1/2003 | Jacobson | ............ | G06Q 20/105 705/41 |
| 2005/0177515 A1* | 8/2005 | Kalavade | ............ | H04L 63/0853 705/52 |
| 2006/0265340 A1* | 11/2006 | Ziv | ............ | G06Q 20/341 705/76 |
| 2008/0072303 A1* | 3/2008 | Syed | ............ | H04L 63/0807 726/10 |
| 2009/0193514 A1* | 7/2009 | Adams | ............ | G06F 21/32 726/17 |
| 2009/0235037 A1* | 9/2009 | Mounier | ............ | G06K 17/00 711/161 |
| 2009/0321519 A1* | 12/2009 | Tran | ............ | G06K 7/0008 235/439 |
| 2010/0076879 A1* | 3/2010 | Mo | ............ | G06Q 30/04 705/34 |
| 2010/0138666 A1* | 6/2010 | Adams | ............ | G06F 21/32 713/186 |
| 2011/0099604 A1* | 4/2011 | Zhou | ............ | H04L 12/14 726/1 |
| 2012/0144194 A1* | 6/2012 | Zhao | ............ | H04L 63/08 713/168 |

FOREIGN PATENT DOCUMENTS

| | | |
|---|---|---|
| CN | 1802029 A | 7/2006 |
| CN | 101163003 A | 4/2008 |
| WO | 2008034090 A1 | 3/2008 |

OTHER PUBLICATIONS

English Translation of the Written Opinion of the International Search Authority in international application No. PCT/CN2010/072524, mailed on Nov. 18, 2010.

* cited by examiner

APPARATUS AND METHOD FOR AUTHENTICATING SMART CARD

TECHNICAL FIELD

The disclosure relates to the field of mobile communications and computers, particularly to an apparatus and a method for authenticating a smart card.

BACKGROUND

Nowadays, with the explosive development of global information, more requirements are presented on the wireless data terminal equipment; and the access and operation of a smart card, particularly a Subscriber Identity Module (SIM) and a Universal Subscriber Identity Module (USIM), are more and more popular, thus the authentication of the smart card is more and more urgent. There are some solutions for authenticating a smart card authentication in a Windows operating system, but there are fewer authentication methods for an Apple operating system; therefore, the development of related products is limited to a great extent.

For global computer subscribers, the Apple operating system has a large share in the market, and more and more devices for authenticating the smart card need to be implemented in devices in the Apple operating system, so a method for authenticating a smart card in the Apple operating system is needed.

However, due to the difference between the operating systems, if the method for authenticating the smart card in the Windows operating system is directly applied to the Apple operating system, it is necessary to rewrite a set of drivers for accessing the smart card in the Apple operating system, which has a large workload and is very complicated; therefore, a solution for authenticating the smart card needs to be designed according to characteristics of the Apple operating system.

SUMMARY

In view of this, the main objective of the disclosure is to provide an apparatus and a method for authenticating a smart card, which use an original module in an Apple computer, so as to reduce the workload, implement authenticating multiple smart cards, and also obtain high compatibility.

In order to achieve the objective above, the technical solution of the disclosure is implemented as follows.

The disclosure provides an apparatus for authenticating a smart card, which is configured to connecting a terminal device and a network server which have authentication operation functions, and includes: a smart card authentication service module, a Smart Card Reader (SCReader) drive module, a Personnel Computer Smart Card Drive (pcscd) service module and a virtual serial port drive module, wherein the smart card authentication service module is configured to send an initialization command to the SCReader drive module, to send an authentication request to the terminal device and the network server, and to compare smart card authentication operation results received from the network server and the terminal device; when the results are identical to each other, the authentication of the smart card is passed;

the SCReader drive module is configured to receive the initialization command from the smart card authentication service module and to send the authentication operation result from the terminal device to the smart card authentication service module;

the pcscd service module is configured to provide a data transmission interface for the smart card authentication service module and to send data to the virtual serial port drive module through the SCReader drive module; and the virtual serial port drive module is configured to transmit data between the terminal device and the SCReader drive module.

The SCReader drive module may be specifically configured to receive the initialization command from the smart card authentication service module, to send a slot acquisition command to the terminal device through the virtual serial port drive module, to receive a slot number from the terminal device, then to send a power-on command to the terminal device, to send an Answer to Request (ATR) command returned by the terminal device to the smart card authentication service module, to receive a data transmission protocol type from the smart card authentication service module, and to encapsulate and then send the data transmission protocol type to the terminal device; and the smart card authentication service module may be specifically configured to receive the ATR command from the SCReader drive module, then to determine that the power-on is completed according to a definition of the power-on return value ATR in the smart card protocol, to select the data transmission protocol type corresponding to the smart card, and to send the data transmission protocol type to the SCReader drive module through the pcscd service module.

The smart card authentication service module may be further configured to send an information acquisition command to the SCReader drive module and to receive and store an International Mobile Subscriber Identifier (IMSI) from the SCReader drive module; and the SCReader drive module may be further configured to encapsulate and send the information acquisition command to the terminal device through the virtual serial port drive module, and to receive the IMSI from the terminal device.

The apparatus may further comprise: a subscriber interface module, configured to provide an operation interface for a subscriber, to send the initialization command to the smart card authentication service module, to send an authentication manner selection indication to the smart card authentication service module after being successfully powered on, to send an information acquisition command to the smart card authentication service module, and to send the authentication request to the smart card authentication service module.

The subscriber interface module may be specifically configured to send the authentication request; the smart card authentication service module may be further configured to receive the authentication request from the subscriber interface module, then to generate a random number and send the random number and authentication request to the SCReader drive module, and to send an IMSI, the random number and the authentication request to the network server to request the network server to perform the authentication operation; and the SCReader drive module may be further configured to encapsulate and send the random number and the authentication request to the terminal device to request the terminal device to perform the authentication operation.

The disclosure further provides a method for authenticating a smart card, which comprises:

initializing the smart card in a terminal device;

performing an authentication operation on the smart card by a network server and the terminal device respectively; and comparing the authentication operation results returned by the network server and the terminal device, wherein the authentication of the smart card is passed when the results are identical to each other.

The initializing the smart card in the terminal device may comprise: a Smart Card Reader (SCReader) drive module receiving the initialization command and then sending a slot acquisition command to the terminal device through a virtual serial port drive module; the terminal device returning a slot number in which the smart card is inserted to the SCReader drive module; the SCReader drive module receiving the slot number and then sending a power-on command to the terminal device through the virtual serial port drive; the terminal device, after being powered on, returning an Answer to Request (ATR) command to the SCReader drive module; the SCReader drive module sending the ATR command to the smart card authentication service module; the smart card authentication service module determines that the power-on is completed according to the ATR command; the smart card authentication service module selecting and sending a data transmission protocol type corresponding to the smart card to the SCReader drive module through a Personnel Computer Smart Card Drive (pcscd) service module; and the SCReader drive module encapsulating and sending the data transmission protocol type to the terminal device.

The method may further comprise: after the smart card in the terminal device is initialized, the smart card authentication service module receiving an information acquisition command from a subscriber interface module and sending the information acquisition command to the SCReader drive module; the SCReader drive module encapsulating and then sending the information acquisition command to the terminal device; the terminal device receiving the information acquisition command, then sending an IMSI of the smart card to the smart card authentication service module through the SCReader drive module, and storing the IMSI.

The performing the authentication operation on the smart card by the network server and terminal device may comprise: the smart card authentication service module receiving an authentication request from the subscriber interface module, generating a random number and sending the random number and the authentication request to the SCReader drive module; the SCReader drive module encapsulating and then sending the random number and the authentication request to the terminal device; the terminal device performing the authentication operation according to the random number, sending an operation result to the smart card authentication service module through the SCReader drive module, and sending the random number, the IMSI and the authentication request to the network server; and the network server determining a type of the smart card according to the IMSI, performing the corresponding authentication operation on the smart card and sending an operation result to the smart card authentication service module.

Consequently, the apparatus and method for authenticating the smart card have the following advantages:

1: based on the existing virtual serial port drive module in the Apple computer, it is only necessary to construct the SCReader drive module and the smart card authentication service module, so that the original modules are well reused and the workload of the disclosure is reduced;

2: the smart card authentication service module and the SCReader drive module can select the data transmission protocols of multiple kinds of smart cards, so that the apparatus and method have high compatibility and are easy to expand and widely applied;

3: data transmission and the driving function of the smart card are respectively implemented by the virtual serial port drive module and the SCReader drive module; and the function separation degree is high; and 4: the characteristics of the Apple operating system are fully used; the smart card authentication service module and the SCReader drive module are connected by the interface of the pcscd service module; then the smart card authentication service module sends data to the SCReader drive module by the interface of the pcscd service module; and such constructed device has little change on the original operating system, high stability, high fault tolerance and low complexity.

DETAILED DESCRIPTION

The basic idea of the disclosure is: a smart card authentication service module sends an initialization command to initialize a terminal device; after the initialization, the smart card authentication service module sends an authentication request to a network server and the terminal device, and compares smart card authentication operation results received from the network server and the terminal device; when the authentication results are identical to each other, the authentication of the smart card is passed.

The terminal device refers to a device in which a smart card is inserted, has an authentication operation function, and is connected to a computer in a wireless or wired manner.

Figure 1:
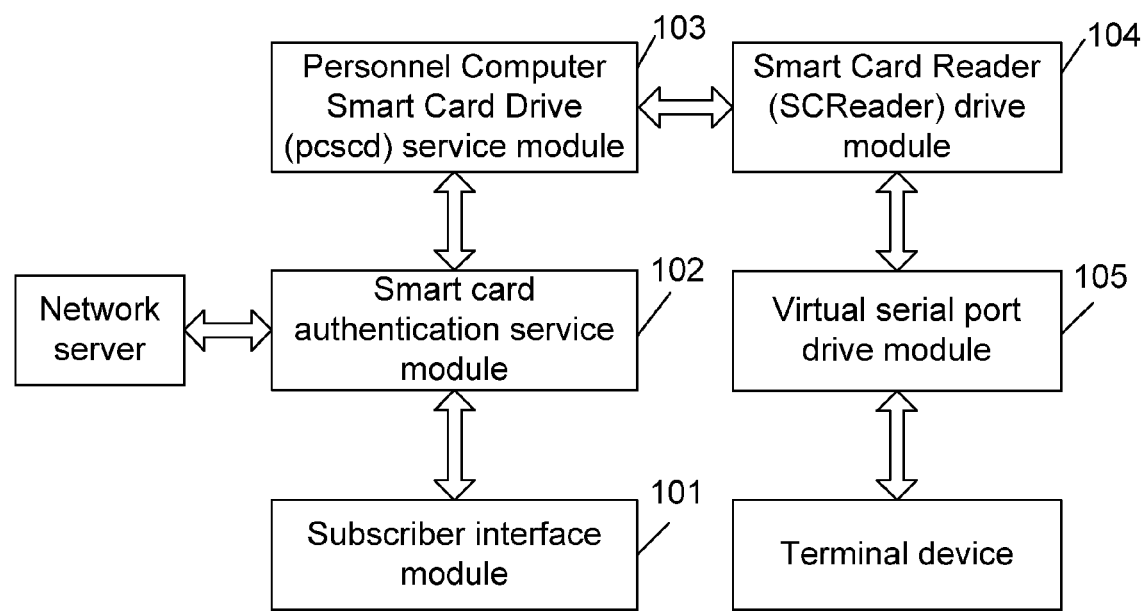
FIG. 1 is a structure diagram of a device for authenticating a smart card in the disclosure.

The disclosure is further described below with reference to one preferred embodiment in detail, as shown in FIG. 1:

the disclosure provides an apparatus for authenticating a smart card, which comprises: a smart card authentication service module 102, a Personnel Computer Smart Card Drive (pcscd) service module 103, a Smart Card Reader (SCReader) drive module 104 and a virtual serial port drive module 105, wherein the smart card authentication service module 102 is configured to send an initialization command to the SCReader drive module 104 by the pcscd service module 103, to perform authentication operation by a terminal device and a network server, and to compare authentication operation results received from the network server and terminal device; when the authentication results are identical to each other, the authentication of the smart card is passed; wherein the operation result includes a Ciphering Key (CK) and a Signature Response (SRES);

the SCReader drive module 104 is configured to receive the initialization command from the smart card authentication service module 102, so as to initialize the smart card in the terminal device, and to send the authentication operation result from the terminal device to the smart card authentication service module;

the pcscd service module 103 is configured to provide a data transmission interface of the smart card authentication service module 102, and to send data to the virtual serial port drive module 105 through the SCReader drive module 104; and the virtual serial port drive module 105 is configured to transmit data between the SCReader drive module 104 and the terminal device.

The SCReader drive module 104 is specifically configured to receive the initialization command from the smart card authentication service module 102, to send a slot acquisition command to the terminal device through the virtual serial port drive module 105, to receive a slot number from the terminal device, then to send a power-on command to the terminal device, to send an Answer to Request (ATR) command returned by the terminal device to the smart card authentication service module 102, to receive a data transmission protocol type from the smart card authentication service module 102, and to encapsulate and then send the data transmission protocol type to the terminal device; the terminal device can only identify data of a Chip Smart Card Interface Device (CCID) protocol of a Universal Serial Bus (USB), thus the encapsulation is configured to convert data into the data which can be identified by the CCID protocol;

the terminal device is configured to receive the slot acquisition command from the SCReader drive module 104, to send the slot number, in which the smart card is inserted, to the SCReader drive module 104, to receive the power-on command from the SCReader drive module 104, then to return the ATR command, wherein the numerical value in the ATR command represents a power-on result; and to receive the data transmission protocol from the SCReader drive module 104; and the smart card authentication service module 102 is specifically configured to receive the ATR command from the SCReader drive module 104, then to determine that the power-on is completed according to a definition of the power-on return value ATR in the smart card protocol; after the power-on is successful, to select the data transmission protocol type corresponding to the smart card, and to send the data transmission protocol type to the SCReader drive module 104 through the pcscd service module 103.

The smart card authentication service module 102 is further configured to send an information acquisition command to the SCReader drive module 104, and to receive and store an International Mobile Subscriber Identifier (IMSI) from the SCReader drive module 104; and the SCReader drive module 104 is further configured to encapsulate and send the information acquisition command to the terminal device through the virtual serial port drive module 105, and to receive the IMSI from the terminal device; and the terminal device receives the information acquisition command and then returns the IMSI to the SCReader drive module 104.

The apparatus further comprises:

a subscriber interface module 101, configured to provide an operation interface for a subscriber, to send the initialization command to the smart card authentication service module 102, to send an authentication manner selection indication to the smart card authentication service module 102 after being successfully powered on (i.e., selecting the data transmission protocol type corresponding to the smart card), and to send an information acquisition command to the smart card authentication service module 102, and to send the authentication request to the smart card authentication service module 102.

The subscriber interface module 101 is specifically configured to send the authentication request;

the smart card authentication service module 102 is further configured to receive the authentication request from the subscriber interface module 101, then to generate a random number by a random number algorithm according to data protocols of different smart cards, to send the random number and the authentication request to the SCReader drive module 104, and to send the IMSI, the random number and the authentication request to the network server; and the SCReader drive module 104 is further configured to encapsulate and send the random number and the authentication request to the terminal device.

The terminal device is further configured to receive the authentication request, to perform the authentication operation according to the random number, and to send the operation result to the smart card authentication service module 102 through the SCReader drive module 104 and the pcscd service module 103; wherein the operation result includes the CK and the SRES; and the network server is configured to receive the authentication request, then to determine the type of the smart card according to the IMSI, to perform the corresponding authentication algorithm, and to return the operation result to the smart card authentication service module 102.

Figure 2:
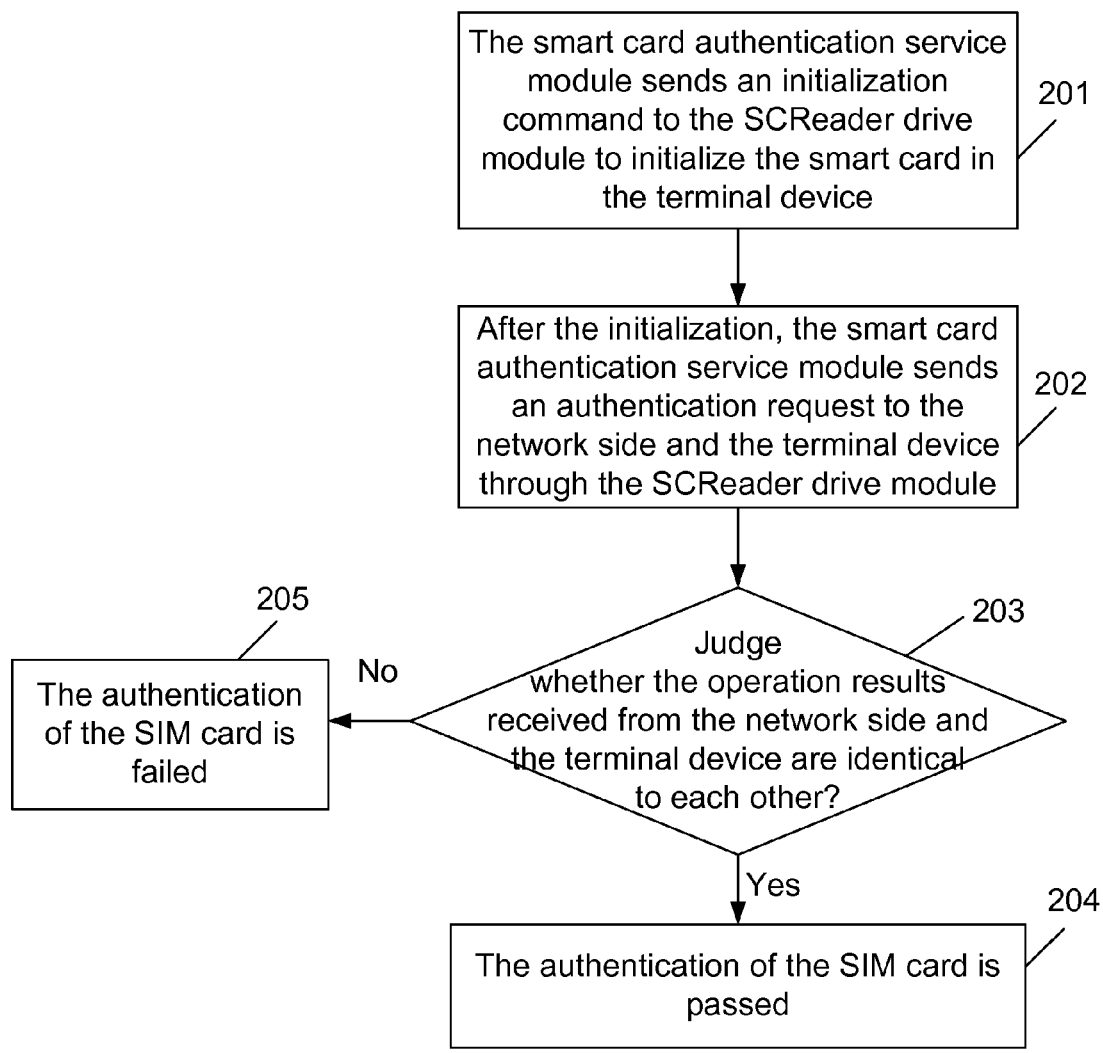
FIG. 2 is a flowchart of a method for authenticating a smart card in the disclosure.

The disclosure further provides a method for authenticating a smart card, as shown in FIG. 2.

Step S201: The smart card authentication service module sends an initialization command to the SCReader drive module to initialize the smart card in the terminal device.

A subscriber selects an initialization function through the subscriber interface module; the subscriber interface module sends a smart card initialization command to the smart card authentication service module; and the smart card authentication service module sends the smart card initialization command to the SCReader drive module through the pcscd service module.

The SCReader drive module receives the initialization command, and then sends a slot acquisition command to the terminal device through the virtual serial port drive module; after receiving the slot acquisition command, the terminal device sends a slot number, in which the smart card is inserted, to the SCReader drive module.

After receiving the slot number of the smart card, the SCReader drive module sends a power-on command to a slot, in which the smart card is inserted, in the terminal device through the virtual serial port drive module according to the slot number; the terminal device completes the power-on operation, and returns an ATR command to the SCReader drive module through the virtual serial port drive module, wherein the numerical value in the ATR command represents the power-on result; the SCReader drive module sends the ATR command to the smart card authentication service module; the smart card authentication service module determines that the power-on is completed according to a definition of the power-on return value ATR in the smart card protocol, and to send the data transmission protocol type to the subscriber interface module.

After the power-on is successful, the subscriber selects a corresponding authentication manner by the subscriber interface module according to the type of the inserted smart card, for example, a 2G smart card corresponds to a 2G authentication manner; the subscriber interface module sends an authentication manner selection indication to the smart card authentication service module; the smart card authentication service module selects a data transmission protocol type corresponding to the smart card, and sends the data transmission protocol type to the SCReader drive module through the pcscd service module; the SCReader drive module encapsulates and sends the data transmission protocol type to the terminal device through the virtual serial port drive module so as to notify the terminal device to transmit data according to the data transmission protocol of the corresponding type, and the initialization is completed.

The data transmission protocol type for the smart card authentication service module can be expanded according to demands of the subscriber in order to implement the authentication of multiple kinds of smart cards.

Step S202: After the initialization, the smart card authentication service module sends an authentication request to the network side and the terminal device through the SCReader drive module.

The subscriber selects an information acquisition command through the subscriber interface module; the subscriber interface module sends the information acquisition command to the smart card authentication service module; the smart card authentication service module sends the information acquisition command to the SCReader drive module through the pcscd service module; the SCReader drive module encapsulates and sends the information acquisition command to the terminal device through the virtual serial port drive module; after receiving the information acquisition command, the terminal device sends the IMSI of the smart card to the SCReader drive module through the virtual serial port drive module; and the SCReader drive module sends the IMSI to the smart card authentication service module through the pcscd service module and stores the IMSI.

The subscriber selects an authentication request function through the subscriber interface module; the subscriber interface module sends the authentication request to the smart card authentication service module; the smart card authentication service module generates a random number by a random number algorithm according to data transmission protocols of different smart cards, and sends the random number and the authentication request to the SCReader drive module through the pcscd service module; the SCReader drive module encapsulates and sends the random number and the authentication request to the terminal device through the virtual serial port drive module; the terminal device performs the authentication operation according to the random number and returns the operation result to the SCReader drive module; and the SCReader drive module sends the operation result to the smart card authentication service module, wherein the operation result includes the CK and the SRES.

The smart card authentication service module sends the random number, the IMSI and the authentication request to the network server at the network side; the authentication request can be either synchronously sent with the authentication request sent to the terminal device, or sent separately, which is determined by the subscriber according to different requirements; the network server, after receiving the random number and the IMSI, determines the type of the smart card according to the IMSI, then performs the corresponding authentication operation and returns the operation result to the smart card authentication service module.

Step S203: The smart card authentication service module judges whether the operation results received from the network side and the terminal device are identical to each other; if yes, step S204 is executed; otherwise, step S205 is executed.

Step S204: If the operation results are identical, the authentication of the smart card is passed, the results are returned to the subscriber interface module, and the flow is ended.

Step S205: If the operation results are different, the authentication of the smart card is failed, the results are returned to the subscriber interface module, and the flow is ended.

What described above are only preferred embodiments of the disclosure, and the scope of protection of the disclosure is not limited herein; any modifications, equivalent replacements, improvements and the like within the spirit and principle of the disclosure shall fall within the scope of protection of the disclosure.

What is claimed is:

1. An apparatus for authenticating a smart card, the apparatus is located in computer and configured to connect a terminal device and a network server which have an authentication operation function;

the apparatus comprising: a smart card authentication service module, a Smart Card Reader (SCReader) drive module, a Personnel Computer Smart Card Drive (pcscd) service module and a virtual serial port drive module, wherein the pcscd service module and the virtual serial port drive module are existing modules of the computer; the smart card authentication service module and the SCReader drive module are new added modules;

the smart card authentication service module is configured to send an initialization command to the SCReader drive module, to send an authentication request to the terminal device and the network server, and to compare smart card authentication operation results received from the network server and the terminal device; when the results are identical to each other, the authentication of the smart card is passed;

the SCReader drive module is configured to receive the initialization command from the smart card authentication service module and to send the authentication operation result from the terminal device to the smart card authentication service module;

the pcscd service module is reused to provide a data transmission interface for the smart card authentication service module and to send data to the virtual serial port drive module through the SCReader drive module; and the virtual serial port drive module is reused to transmit data between the terminal device and the SCReader drive module;

the SCReader drive module is specifically configured to receive the initialization command from the smart card authentication service module, to send a slot acquisition command to the terminal device through the virtual serial port drive module, to receive a slot number from the terminal device, then to send a power-on command to the terminal device, to send an Answer to Request (ATR) command returned by the terminal device to the smart card authentication service module, to receive a data transmission protocol type from the smart card authentication service module, and to encapsulate and then send the data transmission protocol type to the terminal device; and the smart card authentication service module is specifically configured to receive the ATR command from the SCReader drive module, then to determine that the power-on is completed according to a definition of the power-on return value ATR in the smart card protocol, to select the data transmission protocol type corresponding to the smart card, and to send the data transmission protocol type to the SCReader drive module through the pcscd service module;

wherein the smart card authentication service module, the SCReader drive module, the pcscd service module and the virtual serial port drive module are each the result of execution on a processor of instructions stored in a memory.

2. The apparatus according to claim 1, wherein the smart card authentication service module is further configured to send an information acquisition command to the SCReader drive module and to receive and store an International Mobile Subscriber Identifier (IMSI) from the SCReader drive module; and the SCReader drive module is further configured to encapsulate and send the information acquisition command to the terminal device through the virtual serial port drive module, and to receive the IMSI from the terminal device.

3. The apparatus according to claim 2, further comprising:

a subscriber interface module, configured to provide an operation interface for a subscriber, to send the initialization command to the smart card authentication service module, to send an authentication manner selection indication to the smart card authentication service module after being successfully powered on, to send an information acquisition command to the smart card authentication service module, and to send the authentication request to the smart card authentication service module;

wherein the subscribers interface module is a result of execution on a processor of instructions stored in a memory.

4. The apparatus according to claim 3, wherein the subscriber interface module is specifically configured to send the authentication request;

the smart card authentication service module is further configured to receive the authentication request from the subscriber interface module, then to generate a random number and send the random number and authentication request to the SCReader drive module, and to send an IMSI, the random number and the authentication request to the network server to request the network server to perform the authentication operation; and the SCReader drive module is further configured to encapsulate and send the random number and the authentication request to the terminal device to request the terminal device to perform the authentication operation.

5. The apparatus according to claim 1, further comprising:

a subscriber interface module, configured to provide an operation interface for a subscriber, to send the initialization command to the smart card authentication service module, to send an authentication manner selection indication to the smart card authentication service module after being successfully powered on, to send an information acquisition command to the smart card authentication service module, and to send the authentication request to the smart card authentication service module;

wherein the subscriber interface module is a result of execution on a processor of instructions stored in a memory.

6. The apparatus according to claim 5, wherein the subscriber interface module is specifically configured to send the authentication request;

the smart card authentication service module is further configured to receive the authentication request from the subscriber interface module, then to generate a random number and send the random number and authentication request to the SCReader drive module, and to send an IMSI, the random number and the authentication request to the network server to request the network server to perform the authentication operation; and the SCReader drive module is further configured to encapsulate and send the random number and the authentication request to the terminal device to request the terminal device to perform the authentication operation.

7. A method for authenticating a smart card, applied to an apparatus for authenticating the smart card; the apparatus is located in a computer and comprises a smart card authentication service module and a Smart Card Reader (SCReader)drive module, the pcscd service module and the vitual serial port drive module, wherein the pcscd service module and the virtual serial port drive module are existing modules of the computer; the smart card authentication service module and the SCReader drive module are new added modules; the method comprising:

initializing the smart card in a terminal device;

performing an authentication operation on the smart card by a network server and the terminal device respectively; and comparing the authentication operation results returned by the network server and the terminal device, wherein the authentication of the smart card is passed when the results are identical to each other;

wherein the initializing the smart card in the terminal device comprises:

the SCReader drive module receiving the initialization command and then sending a slot acquisition command to the terminal device through the virtual serial port drive module; the terminal device returning a slot number in which the smart card is inserted to the SCReader drive module; the SCReader drive module receiving the slot number and the sending a power-on command to the terminal device through the virtual serial port drive module;

the terminal device, after being powered on, returning an Answer to Request (ATR) command to the SCReader drive module; the SCReader drive module sending the ATR command to the smart card authentication service module; the smart card authentication service module determines that the power-on is completed according to the ATR command;

the smart card authentication service module selecting and sending a data transmission protocol type corresponding to the smart card to the SCReader drive module through the pcscd service module; and the SCReader drive module encapsulating and sending the data transmission protocol type to the terminal device;

wherein the smart card authentication service module, the SCReader drive module, the pcscd service module and the virtual serial port drive module are each the result of execution on a processor of instructions stored in a memory.

8. The method according to claim 7, further comprising:

after the smart card in the terminal device is initialized, the smart card authentication service module receiving an information acquisition command from a subscriber interface module of the apparatus and sending the information acquisition command to the SCReader drive module; the SCReader drive module encapsulating and then sending the information acquisition command to the terminal device; the terminal device receiving the information acquisition command, then sending an IMSI of the smart card to the smart card authentication service module through the SCReader drive module, and storing the IMSI;

wherein the subscriber interface module is a result of execution on a processor of instructions stored in a memory.

9. The method according to claim 8, wherein the network server and terminal device perform the authentication operation on the smart card comprises:

the smart card authentication service module receiving an authentication request from the subscriber interface module, generating a random number and sending the random number and the authentication request to the SCReader drive module; the SCReader drive module encapsulating and then sending the random number and the authentication request to the terminal device; the terminal device performing the authentication operation according to the random number, sending an operation result to the smart card authentication service module through the SCReader drive module, and sending the random number, the IMSI and the authentication request to the network server; and the network server determining a type of the smart card according to the IMSI, performing the corresponding authentication operation on the smart card and sending an operation result to the smart card authentication service module.

* * * * *